United States Patent
Heimala et al.

(10) Patent No.: US 7,510,593 B2
(45) Date of Patent: Mar. 31, 2009

(54) METHOD FOR PRODUCING CONCENTRATES

(75) Inventors: Seppo Heimala, Pori (FI); Mikko Ruonala, Pori (FI)

(73) Assignee: Outotec OYJ, Espoo (FI)

( * ) Notice: Subject to any disclaimer, the term of this patent is extended or adjusted under 35 U.S.C. 154(b) by 380 days.

(21) Appl. No.: 10/564,477

(22) PCT Filed: Jul. 14, 2004

(86) PCT No.: PCT/FI2004/000451

§ 371 (c)(1),
(2), (4) Date: Jan. 13, 2006

(87) PCT Pub. No.: WO2005/007902

PCT Pub. Date: Jan. 27, 2005

(65) Prior Publication Data
US 2006/0272454 A1    Dec. 7, 2006

(30) Foreign Application Priority Data
Jul. 17, 2003   (FI)   ................................. 20031083

(51) Int. Cl.
  C22B 3/04   (2006.01)
  C22B 3/44   (2006.01)
(52) U.S. Cl. .......................................... 75/743; 423/27
(58) Field of Classification Search ................... 75/743, 75/744; 423/23–48
  See application file for complete search history.

(56) References Cited

U.S. PATENT DOCUMENTS

| 2,755,172 | A |   | 7/1956 | McGauley et al. |
| 3,827,557 | A | * | 8/1974 | Fischer .......................... 209/167 |
| 3,957,602 | A | * | 5/1976 | Johnson et al. .............. 205/582 |
| 4,152,142 | A | * | 5/1979 | Schlitt, III et al. ............ 75/424 |

(Continued)

FOREIGN PATENT DOCUMENTS

FI   WO 2005/007901 A1 * 1/2005

OTHER PUBLICATIONS

M. Ruonala et al, Different aspects od using electrochemical potential measurements in mineral processing, Int. J. Miner. Process. 52 (1997) p. 97-110.*

*Primary Examiner*—Roy King
*Assistant Examiner*—Mark L Shevin
(74) *Attorney, Agent, or Firm*—Buchanan Ingersoll & Rooney PC

(57) ABSTRACT

The invention relates to a method for processing concentrates, particularly concentrates produced from copper sulfide-based ores. According to the method, the concentrate (4) to be processed, obtained from ore concentration, is divided into two parts, to a concentrate (7) mainly containing poorly soluble components, and to a concentrate (8) mainly containing well soluble components. The concentrate (8) containing well soluble components is conducted to a leaching step (9), and the solution (13) obtained from said leaching step is conducted to at least one conversion step (11, 16), and to the conversion step (11) that is located first in the flowing direction, there is fed the concentrate (7) containing poorly soluble components. In the conversion step (11) that is located first in the flowing direction, at least the copper contained in the solution is converted into sulfidic form by means of the sulfide-form iron of the concentrate (7) containing poorly soluble components, and at least part of the solution (12) obtained from the conversion step (11, 16) is returned to the leaching step (9).

16 Claims, 1 Drawing Sheet

U.S. PATENT DOCUMENTS

| | | | |
|---|---|---|---|
| 4,256,553 A * | 3/1981 | Baczek et al. | 205/584 |
| 4,717,419 A * | 1/1988 | Makinen et al. | 75/623 |
| 4,917,775 A * | 4/1990 | Rantapuska et al. | 205/775 |
| 5,108,495 A * | 4/1992 | Heimala et al. | 75/386 |
| 5,616,168 A * | 4/1997 | Gabb et al. | 75/718 |
| 5,795,465 A | 8/1998 | Arbiter | |
| 6,319,389 B1 | 11/2001 | Fountain et al. | |
| 6,537,440 B1 * | 3/2003 | Dreisinger et al. | 205/580 |
| 7,341,700 B2 * | 3/2008 | Marsden et al. | 423/28 |
| 2008/0050293 A1 * | 2/2008 | Dreisinger et al. | 423/27 |
| 2008/0152558 A1 * | 6/2008 | Hultholm et al. | 423/27 |

* cited by examiner

METHOD FOR PRODUCING CONCENTRATES

BACKGROUND

The present invention relates to a method for producing concentrates from copper-bearing raw materials, such as ores.

For treating primary copper raw materials, there are mainly two principal lines. One is the concentration—smelting—electrolytic refining line, and the other is leaching, such as the heap leaching—liquid-liquid extraction and electrolytic recovery line. With respect to reasons connected to raw material quality, environmental protection, geography and economy, both processing lines are meeting growing difficulties.

When starting to concentrate copper-based raw materials, we often face a situation where a large share of the mineralization is oxidized and possibly difficult to flotate. Among these are particularly copper ore deposits containing copper silicates and iron oxides. Also mixed grains with copper sulfide and pyrite may be nearly impossible with respect to flotation. A specific group of problems is represented by finely divided, often pyritic copper-zinc-lead ore deposits. The treatment of said ore deposits by traditional methods usually renders a fairly weak result as regards yields and concentrate contents. When transport costs to the smelter often are too high with respect to competition, even with a high-quality concentrate, they are even more so with a low-quality concentrate. What is more, in that case environmental hazards are increased at two separate locations, for instance because of arsenic. The smelting process itself typically includes many steps, among them smelting for example in a flash smelting furnace, converting, anode furnace treatment; sulfuric acid production for gases, and electric furnace or concentration process for slag. Often the reason for multistep smelting processes that are economically ineffective is the poor quality of the feed, i.e. the concentrate.

As regards the second prevailing method—processing based on heap leaching—it is likewise facing harder times. As long as the ore neither contains remarkable amounts of precious metals nor remarkable amounts of copper as chalcopyrite, $CuFeS_2$, or as some other compound that is hard to dissolve, the situation is fairly good. However, as a rule, a growing share of raw materials even in already functioning mines is particularly formed of slow-dissolving copper minerals. This means increasing expenses. Another drawback of the method based on liquid-liquid extraction is the restricted lifetime of nearly all mines. If the whole process chain from the mine to cathode copper is based on one deposit only, the plant generally faces an unsound situation, as the volume of the ore body is gradually used up. As a result, the rate of profit for the invested capital is not optimal.

In geology, it was found out already at least a hundred years ago that metal sulfides tend to turn, for instance when precipitating from a solution ions of another element to sulfides. The observations gradually accumulated into real knowledge of the reasons of this phenomenon, to the extent that roughly 50 years ago, a patent U.S. Pat. No. 2,568,963 was published on the matter. According to said US patent, copper concentrate is divided into a fraction to be leached, and into a fraction used in the precipitation of copper sulfide (CuS). The obtained CuS is leached into sulfate in order to produce copper. The solid and soluble side components are simply removed from the process. Later, in 1956, the same inventors published a new patent, U.S. Pat. No. 2,755,172, where the metal ions of the solution, i.e. copper, cobalt, nickel and zinc, are precipitated in succession as sulfides, in the order CuS, CoS, NiS, ZnS, by using a metal sulfide of the MeS type that is more soluble than the element to be precipitated. In the precipitation process, the pH gradually rises, so that for instance in the precipitation of zinc sulfide (ZnS), the pH of the sulfate solution is within the range 6.2-7.

Because the starting point in the method of the U.S. Pat. No. 2,755,172 is the leaching of the raw material resulting from the production of sulfuric acid, the employed pH range 6.2-7 means that there is an economically demanding neutralization step. This fact is emphasized even further, when the suggested neutralization reagents are among others ammonia, lye or $Ca(OH)_2$, or when a suggested sub-step of the process is a reaction where $Fe^{3+}$ is reduced by hydrogen sulfide ($H_2S$), producing sulfur, $Fe^{2+}$ and $H_2SO_4$.

The weakness in the know-how of the processes described in the above mentioned U.S. Pat. Nos. 2,568,963 and 2,755,172, as well as the both chemically and economically unrealistic approach, are now, almost 50 years later, revealed by several features of the above mentioned US patents. First of all, in reality the natural sulfide minerals are not mainly of the type MeS only, but their metal/sulfur ratio (Me/S ratio) fluctuates within a wide range. Several metal sulfides are alloyed sulfides in the significance that metal (Me) is partly replaced by other sulfides, for example sulfur is replaced by arsenic and antimony, not to mention precipitation grains and other structural impurities, in comparison with pure MeS-type model minerals. As a consequence of the above mentioned facts, the method according to the U.S. Pat. No. 2,755,172 simply does not work with real raw materials. The method according to the U.S. Pat. No. 2,568,963 has better chances to function, but it does not offer a solution for example how to handle iron balances and acid balances. In addition, the U.S. Pat. No. 2,568,963 states that copper concentrate is needed in the leaching process, because other concentrates are too poor for leaching. What is more, a commercial-quality metal copper product cannot be achieved by the method according to the U.S. Pat. No. 2,568,963.

One reaction type in the production of rich copper concentrates is:

$$CuFeS_2 + Cu^{2+} = Cu_xS + Fe^{2+} \qquad (1)$$

The reaction (1) has often been found as slow. Therefore a solution has been searched in the direction of reducing conditions. The employed reductants have been for example elemental copper ($Cu^\circ$), chromium ($Cr^\circ$), zinc ($Zn^\circ$), cobalt ($Co^\circ$), nickel ($Ni^\circ$) or iron ($Fe^\circ$), sulfur oxide ($SO_2$) or organic reductants. In laboratory conditions, the obtained reaction time for the reaction

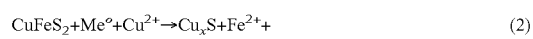

$$CuFeS_2 + Me^\circ + Cu^{2+} \rightarrow Cu_xS + Fe^{2+} + \qquad (2)$$

is one hour, but it is understandable that in reality, a contact for example between $Fe^\circ$ powder and $CuFeS_2$ grain is not easily maintained. As such, the main principle itself for using metal powder is, for economical reasons, impossible in commercial processes. As for the use of $SO_2$, it results in an excess of $H_2SO_4$ acid that is created in the process.

Moreover, it has been found that for producing copper-rich copper sulfide ($Cu_xS$), there are in principle two ways, i.e. a conversion based method according to reaction (1), and a selective leaching route by using an acidic reagent. The latter can be illustrated for instance by the reaction (3):

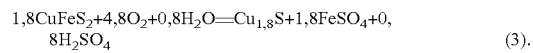

$$1{,}8CuFeS_2 + 4{,}8O_2 + 0{,}8H_2O = Cu_{1.8}S + 1{,}8FeSO_4 + 0{,}8H_2SO_4 \qquad (3).$$

Thus a typical process based on selective leaching produces a remarkable amount of sulfuric acid and problematic $FeSO_4$ solution, without essentially increasing the usage value of the copper sulfide product, because it contains harmful ingredients, such as $FeS_2$ and silicates.

According to the DE patent application 2,207,382, $CuFeS_2$ concentrate is treated in the presence of copper sulfate ($CuSO_4$) by conversion in the temperature range 90-180° C. into $Cu_xS$ and $FeSO_4$. The obtained $FeSO_4$ solution is hydrolyzed in an autoclave in the temperature range 180-230° C. into a solid $Fe^{3+}$ compound and $H_2SO_4$ solution. The solid copper sulfide ($Cu_xS$) is leached by oxidizing with $H_2SO_4$ into $CuSO_4$, which after cementing purification carried out by elemental copper ($Cu^o$) is reduced into copper with hydrogen. The method according to the DE patent application 2,207,382 is feasible with pure concentrates that contain only small amounts of for example zinc, lead and pyrite. Similar problems are also included in methods described in the patents CA 1,069,317 and U.S. Pat. No. 3,957,602. In the former method, $CuFeS_2$ concentrate is converted to $Cu_xS$ and $FeCl_2$ solution by chloride leaching. $Cu_xS$ is leached, and after cleaning, metallic copper is reduced from CuCl. Impurities are removed from the $FeCl_2$ solution, and by means of electrolysis, $FeCl_2$ is turned into $FeCl_3$ solution and metallic iron. This method could be fairly feasible, if neither the purity of the product nor the economical values in particular would have any importance. The method according to the U.S. Pat. No. 3,957,602 is a basic version of two main lines based on the production of $Cu_xS$ by using fairly pure copper concentrate. Here the iron contained in $CuFeS_2$ is in connection with the leaching of $Cu_xS$ turned into jarosite. However, the method according to the U.S. Pat. No. 3,957,602 does not take into account for example the recovery of precious metals and $MoS_2$, but its use brings along additional expenses in comparison with existing mainstream methods.

Nearer to the method of the present invention come the processes described in the reference publications Yuill W. A. et al, Copper Concentrate Enrichment Process, SME-AIME Annual Meeting, Los Angeles, Calif., 26 Feb.-1 Mar. 1984 and Bartlett R. W., A Process for Enriching Chalcopyrite Concentrates, New Orleans, 2-6 Mar. 1986, pp. 227-246. As for the first alternative, written in 1984 by Yuill et al, the most serious drawbacks are connected to the leaching process carried out at the temperature of 200° C. and to the oxidation of nearly all sulfidic sulfur, and to a great extent also of pyritic sulfur, into sulfate, i.e. into sulfuric acid. The situation is attempted to be improved by the use of lime both in the leaching autoclave and in the conversion autoclave, and also in the copper removal of the solutions. The obtained conversion product is further subjected to flotation, which causes extra expenses, and in reality also copper and precious metal losses in this process. As a whole, for the obtained rich $Cu_xS$ product, there is not found a further treatment process that would be more advantageous with respect to usage, but the $Cu_xS$ concentrate must compete with the traditional copper concentrate.

In the process described by Bartlett in 1987, the autoclave steps are combined into one $CuFeS_2$ leaching conversion step operated at the temperature of 200° C. From the point of view of the equipment technology, the process is simplified. Still the problems related to the creation of $H_2SO_4$, to iron removal and the use of lime for the most part remain the same. As a back balance for the simplification, the degree of conversion of the $CuFeS_2$ concentrate is essentially weakened, mixed $FeS_2$-copper sulfide grains remain in the product, and the recovery of copper in the final concentrate is lowered for instance owing to increased problems in the selective flotation of the end product. From the point of view of the smelter, the obtained product is still not attractive in comparison with the traditional concentrate.

SUMMARY

In one embodiment is disclosed a method for processing concentrates, particularly concentrates produced from copper sulfide-based ores, wherein the concentrate to be processed, obtained from ore concentration, is divided into two sulfidic concentrates of different types, to a concentrate mainly containing poorly soluble components such as the precious metals contained in the ore and containing sulfide-form iron, and to a concentrate mainly containing well soluble components, and that the concentrate containing soluble components is conducted to a leaching step, and the solution obtained from said leaching step is conducted to at least one conversion step, and that in the conversion step located first in the flowing direction, there is fed the concentrate containing poorly soluble components, and that in the conversion step that is located first in the flowing direction, at least the copper contained in the solution is converted to sulfidic form by means of the sulfide-form iron of the concentrate containing poorly soluble components, and that at least part of the solution obtained from the conversion step is returned to the leaching step.

DETAILED DESCRIPTION OF SPECIFIC EMBODIMENTS

Figure 1:
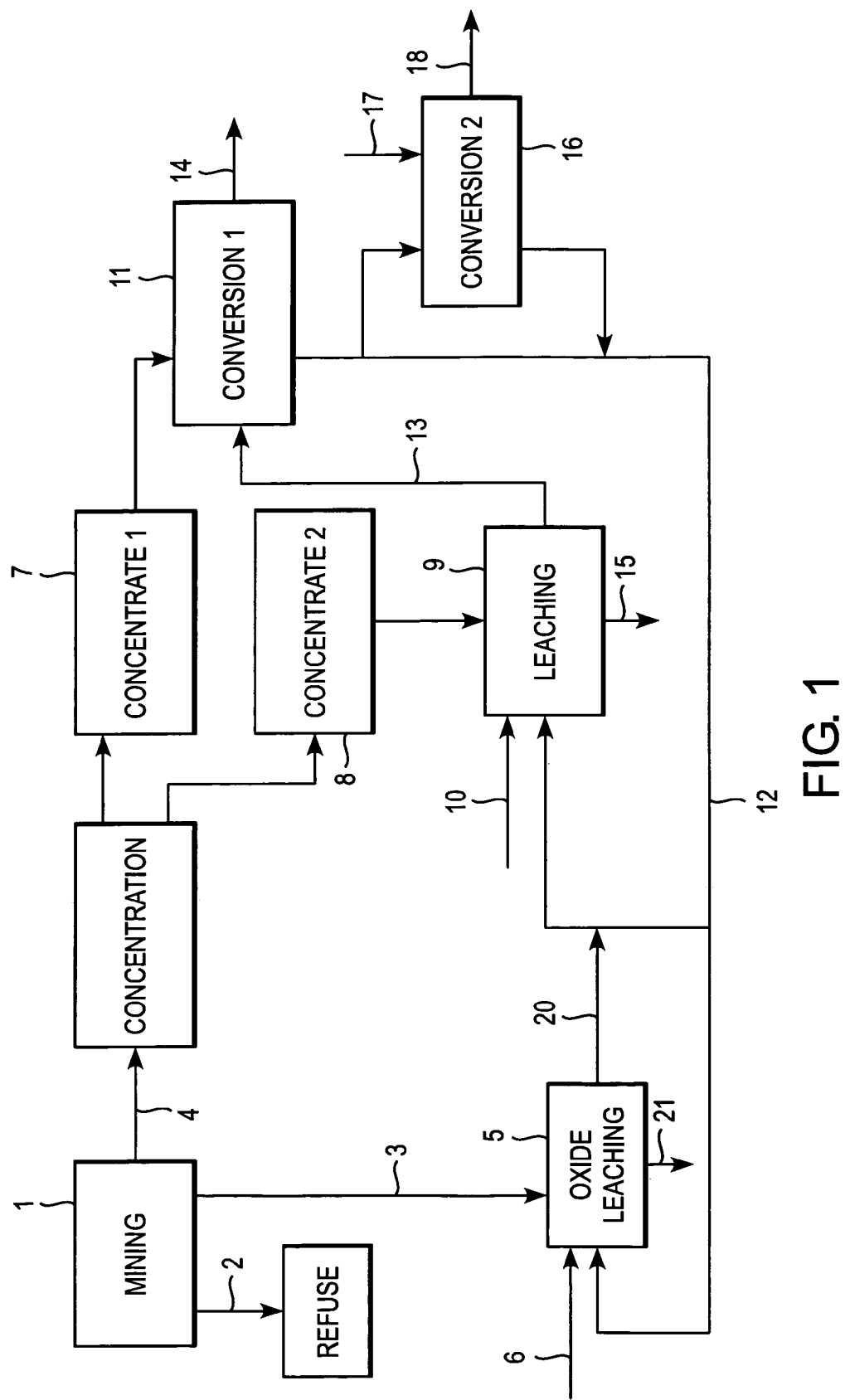
FIG. 1 is a flow diagram illustrating a specific embodiment of the method disclosed herein.

The object of the present invention is to eliminate drawbacks of the prior art and to achieve a method for processing chemically and structurally difficult copper raw materials, which method is more effective than the state of the art, both as regards investment technology, process technology and environmental protection. The essential novel features of the invention are enlisted in the appended claims.

When applying the method according to the invention after ore mining, the ore is divided into three fractions: a fraction to be concentrated, a fraction suitable for heap leaching or for another corresponding leaching process, and a gangue fraction. According to the invention, the fraction to be concentrated is treated by a process suitable for the raw material in question, for example a flotation process or a process based on differences in specific weight or magnetism, so that there are achieved two sulfidic concentrates of different types. The sulfidic concentrate of the first type represents a relatively poorly soluble concentrate containing for instance the precious metals contained in the ore. As for the sulfidic concentrate of the second type, it represents a concentrate that aims at the maximization of the recovery of valuable components leached by some leaching method. When so desired, the refuse created in the production of concentrates, i.e. the concentration sand, can also be conducted to concentration with a possible oxidic material.

The soluble sulfidic concentrate of the second type, obtained from concentration, is conducted to a sulfate-based or chloride-based leaching step, or to a leaching step created by a combination of these two, to which leaching step also the solution obtained from the leaching of oxidic materials can be conducted, if necessary. Advantageously the leaching is carried out as atmospheric leaching in the temperature range 50-105° C. The leaching can also be carried out in an autoclave. In addition, at least part of the solution from the conversion step after the leaching step is conducted to the leaching step.

An acidic solution obtained from the leaching of the concentrate of the second type, which solution is possibly concentrated by recirculation, is conducted to a conversion step carried out with the first type concentrate in the temperature range 90-200° C., advantageously in the temperature range 150-190° C. Now, as a consequence of the following reaction (4) in principle:

$$Cu^{n+} + CuFeS_2, (ZnS, PbS) = Cu_xS + Fe^{2+} + (Zn^{2+} + Pb^{2+}) + \quad (4)$$

there is obtained a rich $Cu_xS$ concentrate advantageously containing the precious metals, which is conducted to further treatment, for instance to the production of blister copper. Depending for example on the ratio of the copper-zinc-lead-iron sulfide contents in the initial ore and in the scrap-like raw material going to leaching, all of the solution after the conversion goes first to the circulation, to leaching, or then part of it—in a balanced situation part of the recirculated solution—is conducted to at least one further conversion step after the conversion of copper, where for instance the $Zn^{2+}$ and/or $Pb^{2+}$ of the solution are precipitated as sulfide in the presence of iron sulfide either as a consequence of reactions (5) and (6) or reactions (7) and (8)

$$Fe_{1-x}S + Zn^{2+} = ZnS + Fe^{2+} + \quad (5)$$

$$Fe_{1-x}S + Pb^{2+} = PbS + Fe^{2+} + \quad (6)$$

or $$FeS + Zn^{2+} = ZnS + Fe^{2+}, \quad (7)$$

$$FeS + Pb^{2+} = PbS + Fe^{2+} \quad (8).$$

The production of lead sulfide (PbS) here requires a solution base, such as a chloride solution or a mixed sulfate-chloride solution, in which $Pb^{2+}$ is soluble.

In these cases, zinc sulfide (ZnS) and lead sulfide (PbS) can be precipitated either together or separately, depending, among others, on the content ratios of zinc and lead, and on the further processing of zinc sulfide and lead sulfide. The use of $Fe_{1-x}S$ requires either autoclave conditions, or the use of a reductant of $Fe^{3+}$. The use of (FeS) in the precipitation of ZnS and PbS is advantageous because said reactions are very fast already at room temperature. Because prior to the precipitation of ZnS and PbS, the feed solution can easily be cleaned by known methods of typical impurities of Pb and Zn, the above described sub-process is a very suitable preliminary step for the pyrometallurgical production of both Pb and Zn, among others.

The use of pyrite ($FeS_2$) as a reagent for producing $Fe_{1-x}S$ or FeS can be justified for instance when pyrite is obtained as already finely divided, as a side product from ore treatment, or when pyrrhotite ($Fe_{1-x}S$) is not available nearby, or when pyrrhotite should be mined separately. Moreover, $FeS_2$ often contains gold, among others, which can then be recovered in connection with the precipitation of zinc sulfide and/or lead sulfide.

Apart from acid, the main component in the recirculated solution obtained from the conversion step of the method according to the invention and returned back to the leaching steps is iron. The iron is removed mainly in connection with the leaching of the second type sulfide concentrate as oxide, oxide hydrate or hydronium-alkali-jarosite. For higher iron contents, an acid-regenerating thermohydrolysis carried out at a raised temperature is viable, too.

However, the factor that ensures an optimal economy and effective operation in general for the whole process of the method according to the invention, is connected to the mineral-specific control of each sub-step and to the fact that the flotation processes used for creating the first and second type concentrates are advantageously controlled by electrochemical, mineral-specific measurements described for example in the patents U.S. Pat. Nos. 5,108,495 and 4,561,970. A similar procedure also is realized for other process steps, such as leaching and conversion.

In this way, by measuring and adjusting especially sulfur chemistry, contents of soluble components and the oxidation rate of different minerals, directly in on-site conditions, each sub-step is realized in the best possible way. For example, as regards the leaching of chalcopyrite based ($CuFeS_2$) ore containing precious metals, a couple of very important details are the leaching of $CuFeS_2$ in atmospheric conditions, when necessary, and the leaching of gold and silver as well as their minerals in sulfate or chloride based solutions, in slurries containing sulfidic minerals. Usually the leaching of $CuFeS_2$ is carried out in the temperature range 50-105° C. In that case, according to the method of the invention, for example precious metals are obtained in the solution with a good recovery. In addition, it is important to maintain a given potential rate with the $CuFeS_2$ itself, and certain ratios $HSO_3^=$, $S_2O_3^=$, $S_4O_6^=$, $S_5O_6^=$ etc. in the solution and on the mineral surfaces. In flotation, the use of corresponding methods ensures results that approach the limits defined by the degree of purely grinding. A good region in the leaching of $CuFeS_2$ is usually located, depending on the raw material, among others, within the range +450-+650 mV vs AgCl/Ag. At the same time, however, the potential of $Cu_{1.96}S$ must be clearly lower, and for example the potential of the silver ($Ag^o$) electrode should preferably be less than +200 mV. In similar fashion, by controlling the leaching of gold, gold and silver are transferred to the solution as thiosulfate complexes, and they are obtained in the $Cu_xS$ product in conversion, together with the precious metals of the first type sulfidic concentrate. A low potential rate in leaching may result for example in the precipitation of silver sulfide $AgS_x$, whereas a high potential rate creates sulfur-rich polythionates that remove for instance gold from the solution in several different ways. As such, it is natural that an effective leach should contain, among others, pyrite, a determined amount of sulfite, or carbon. In addition, catalytic agents, such as nickel and cobalt, contained in the recirculated solutions, can advantageously be used for adjusting the sub-steps of the process.

The invention is described in more detail below with reference to the appended drawing, FIG. 1 being a flow diagram illustrating a preferred embodiment of the invention.

According to the drawing, copper-based ore is mined 1, and the mined ore is divided into different fractions: gangue 2, an oxide-bearing fraction 3 and a fraction 4 to be concentrated. The oxide-bearing fraction 3 is conducted to oxide leaching 5, to which there is fed part of the sulfate solution 12 recirculated from the conversion step 11 of the method according to the invention, and when so desired, also copper-bearing scrap 6. The solution 20 obtained from oxide leaching is conducted to the leaching of the second type concentrate 8, whereas the insoluble part goes to the refuse 21 from oxide leaching.

In concentration carried out by flotation, the fraction 4 is divided into two concentrates: a first type concentrate 7, containing mainly poorly soluble components, such as precious metals, and a second type concentrate 8, containing mainly soluble components. The second type concentrate 8 is conducted to leaching 9, to which there also is fed sulfuric acid 10 and a solution 20 obtained from oxide leaching 5. To the leaching step 9, there also is conducted at least part of the sulfate solution 12 obtained from the conversion step 11.

In the leaching step 9, the copper sulfide based concentrate 8 is leached and neutralized, so that in the leaching 9, the iron is obtained in the refuse 15. The solution 13 obtained from leaching 9 is conducted to a conversion step 11, to which there also is conducted the first type concentrate 7. In the conversion step 11, the copper is returned to sulfide form containing precious metals by means of iron sulfide of the first type concentrate 7 that is fed in the conversion step 11. The copper sulfide 14 containing precious metals is removed from the conversion step 11 and conducted to further processing. Part of the sulfate solution 12 of the conversion step 11 is returned to the leaching step 9 of the second type concentrate 8 and to the oxide leaching step 5, whereas part of the sulfate solution 12 is advantageously conducted for example to a second conversion step 16, for example in order to turn the zinc and lead contained in the solution into sulfide form by means of iron sulfide 17 fed in the conversion step 16, and for removing 18 the zinc and lead for further treatment. The solution from the second conversion step 16 is combined to the sulfate solution 12 of the first conversion step 11 and respectively returned to the preceding process steps.

EXAMPLE

A method according to the invention was applied with a zinc-poor copper sulfide-pyrite ore, the total treated quantity being 447 kg, containing 1.6% by weight copper and 0.47% by weight zinc. In connection with the concentration, from the concentrate under treatment there was separated zinc sulfide concentrate that was conducted to further processing in way known as such. According to the invention, the concentrate under treatment was divided for further treatment into two parts, a primary concentrate (8.7 kg) and a secondary concentrate (32.4 kg). The primary concentrate contained a great deal of poorly soluble chalcopyrite, ($CuFeS_2$), so that the primary concentrate contained 2.1 kg copper, 3.5 kg iron, 4.1 kg sulfur as well as a small amount, 0.1 kg zinc. Apart from copper, the secondary concentrate contained a great deal of pyrite ($FeS_2$), so that the secondary concentrate contained 4.2 kg copper, 11.7 kg iron, and 13.8 kg sulfur, as well as 0.7 kg zinc.

The secondary concentrate was first conducted to sulfuric acid leaching carried out at the temperature of 100-105° C., in oxidizing conditions. The sulfuric acid bearing solution obtained from the leaching, containing 77 g/l copper, 59 g/zinc and 30 g/l iron, was further conducted to a conversion step carried out at the temperature of 160-170° C., where also the primary concentrate was fed. According to the reaction (4) in principle, the copper contained in the solution was turned, by means of the iron contained in the primary concentrate, to copper sulfide ($Cu_xS$) form, at the same time as the already sulfide-form copper contained in the primary concentrate remained sulfidic. The obtained quantity of concentrate was 10.7 kg, containing 5.9 kg copper.

The solution created in the conversion step that according to the reaction (4) in principle contained the iron turned into soluble form, as well as zinc, was partly returned back to the secondary concentrate leaching step, from where 40.1 kg iron was removed as leaching residue and as jarosite precipitate. Part of the conversion step solution was conducted to a new secondary conversion step, where zinc was precipitated by means of troilite (FeS) as sulfide, according to the reaction (7) in principle. The obtained quantity of zinc sulfide concentrate was 1.2 kg, which was combined to the zinc sulfide concentrate obtained in connection with the concentration step and transported to be processed further. The iron sulfate solution obtained from the secondary conversion step was returned, together with the solution from the first conversion step, back to the secondary concentrate leaching step.

The invention claimed is:

1. A method for processing concentrates produced from copper sulfide-containing ores, comprising:
   concentrating a copper sulfide-containing ore to form a first concentrate and a second concentrate separate from the first concentrate, wherein:
      the first concentrate contains chalcopyrite ($CuFeS_2$), and said chalcopyrite contains sulfide-form iron, and
      the second concentrate contains copper sulfide, and is different from the first concentrate;
   leaching the second concentrate in the presence of a leaching solution containing an acid, neutralizing the resulting solution, and precipitating iron from the resulting solution to form a leaching product solution;
   converting the leaching product solution in a series of at least two conversion steps to form a converted solution, comprising:
      a first conversion step, comprising reacting copper contained in the leaching product solution with sulfide-form iron in the first concentrate to form copper sulfide and a converted solution, recovering copper sulfide, and returning at least a portion of the converted solution from the first conversion step to the leaching of the second; and
      a second conversion step, comprising reacting one or more dissolved metals different from copper in the converted solution with a sulfide form iron to form the corresponding metal sulfides.

2. The method of claim 1, wherein the chalcopyrite comprises precious metals contained in the copper sulfide-containing ores.

3. The method of claim 1, wherein the second concentrate contains pyrite ($FeS_2$).

4. The method of claim 1, wherein the one or more dissolved metals comprise zinc, lead, or a combination thereof.

5. The method of claim 1, wherein the leaching of the second concentrate is atmospheric leaching at a temperature of 50° C.-105° C.

6. The method of claim 1, wherein the leaching of the second concentrate is autoclave leaching.

7. The method of claim 1, wherein the converting of the first concentrate and the leachate solution is carried out at a temperature of 90° C.-200° C.

8. The method of claim 7, wherein the converting of the first concentrate and the leachate solution is carried out at a temperature of 150° C.-190° C.

9. The method of claim 1, wherein the sulfide-form iron in the second conversion comprises chalcopyrite ($CuFeS_2$).

10. The method of claim 1, wherein the sulfide-form iron in the second conversion comprises troilite (FeS).

11. The method of claim 1, wherein the sulfide-form iron in the second conversion comprises pyrrhotite ($Fe_{1-x}S$).

12. The method of claim 1, wherein the concentrating of the copper sulfide-containing ore comprises a flotation process.

13. The method of claim 12, wherein the flotation process is controlled using mineral-specific electrochemical measurements.

14. The method of claim 1, wherein the leaching of the second concentrate is controlled using mineral-specific electrochemical measurements.

15. The method of claim 1, wherein the converting of leaching product solution is controlled using mineral-specific electrochemical measurements.

16. The method of claim 2, wherein the precious metals are recovered in the first conversion.

* * * * *